Feb. 6, 1934.  R. A. DUNPHY  1,946,199
PURIFICATION OF ORGANIC HALO-FLUORO COMPOUND
Filed June 28, 1932
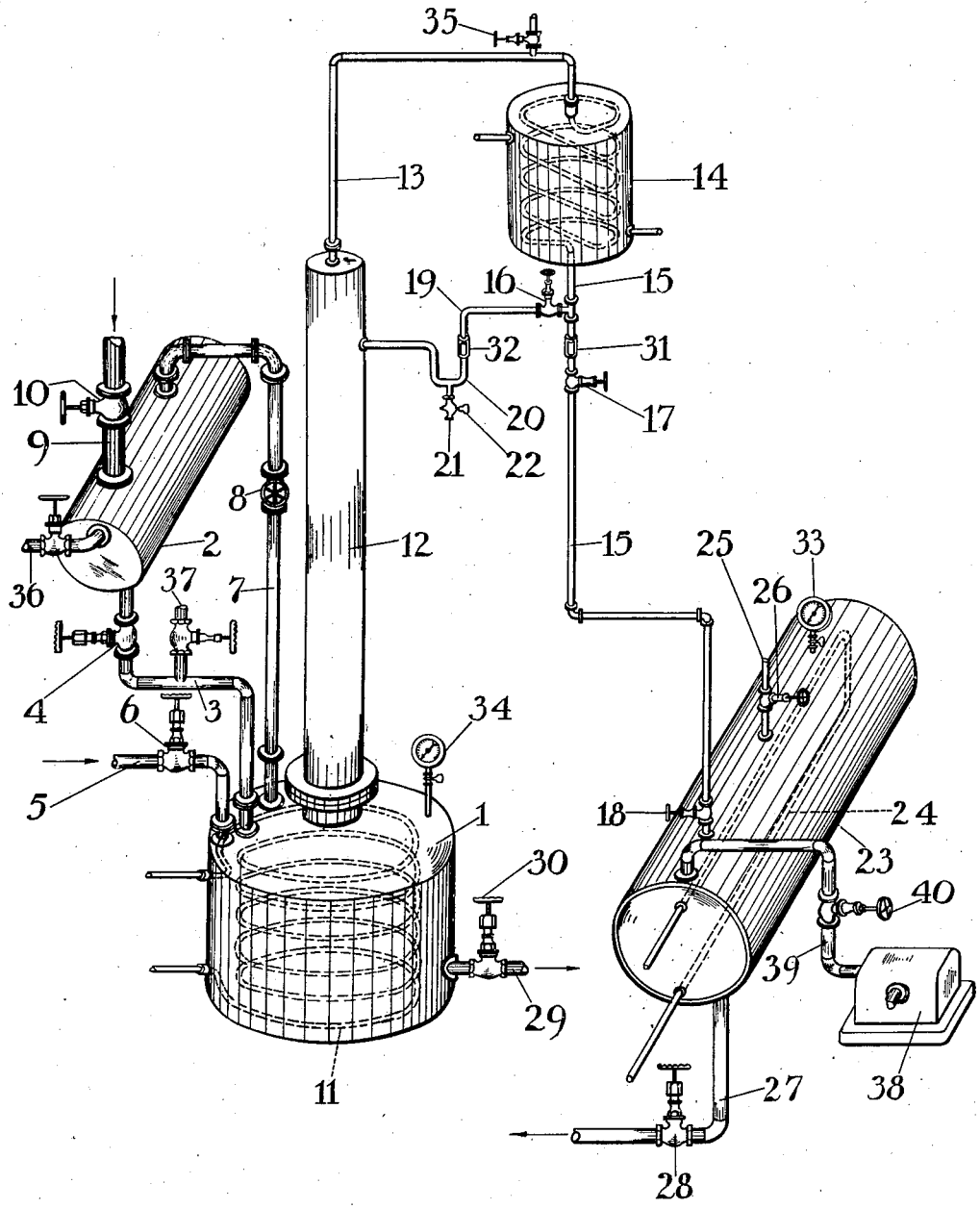
Raymond A. Dunphy  INVENTOR.
BY
ATTORNEY.

Patented Feb. 6, 1934

1,946,199

UNITED STATES PATENT OFFICE 1,946,199

PURIFICATION OF ORGANIC HALO-FLUORO-COMPOUNDS

Raymond A. Dunphy, Penns Grove, N. J., assignor, by mesne assignments, to Kinetic Chemicals, Incorporated, Wilmington, Del., a corporation of Delaware Application June 28, 1932. Serial No. 619,674

21 Claims. (Cl. 260—162)

This invention relates to organic halogen compounds, more particularly compounds containing one or more acyclic carbon atoms having attached thereto one or more fluorine atoms, and a process for the purification thereof.

In the manufacture of organic fluorine compounds such as, for example, difluoro-dichloro-methane, fluoro-chloro-methane, fluoro-tri-chloro-methane, flouoro-chloro-ethanes, and, in general, compounds such as result from the reaction of a fluorinating agent with compounds containing one or more acylic carbon atoms having attached thereto one or more halogens other than fluorine, the reaction products and the products resulting after partial purification may have present therein acidic impurities such as, for example, hydrogen halides, phosgene, sulfuric acid, sulfur dioxide, thionyl fluoride, hydrogen sulfide and analogous compounds. Hydrogen halides are customarily removed from the reaction products by aqueous scrubbing agents such as aqueous solutions of alkaline reagents. The fluorinated products obtained after such aqueous scrubbing normally contain water which is usually removed by scrubbing with concentrated sulfuric acid. It has been noted that products obtained after the sulfuric acid treatment may still contain small amounts of acidic impurities, particularly phosgene and sulfur dioxide. Such impurities if allowed to remain in the final products render them unfit for commercial use. Difficulty has been encountered in their removal because the ordinary methods which would be applicable, as for example aqueous scrubbing with an alkali metal hydroxide, introduce water into the fluorinated products which forms ice when they are liquefied and renders them practically worthless for use as refrigerants.

It is an object of the present invention to produce organic fluorine compounds free from obnoxious and undesirable impurities of the character above described. A further object is to provide a new and improved process for purifying organic fluorine compounds. Another object is to provide a method of removing small amounts of acidic impurities from compounds containing one or more acylic carbon atoms having attached thereto one or more fluorine atoms, without contaminating the product with water. A still further object is to provide a method of continuously purifying and separating certain organic fluorine compounds from mixtures with other organic fluorine compounds and/or other organic halogen derivatives. A more specific object is to produce substantially dry and pure fluoro-chloro derivatives of aliphatic hydrocarbons. Other objects will appear hereinafter.

These objects are accomplished by treating organic fluorine compounds containing acidic impurities with ammonia, preferably in liquid phase and in a closed distillation cycle, and separating organic fluorine compounds from the resultant product.

The invention may be well illustrated by the processes hereinafter described and the apparatus shown in the accompanying drawing, in which similar characters refer to similar parts.

In carrying out the purification treatment with ammonia in the apparatus shown, a liquid fluorinated product containing acidic impurities is introduced into still-pot 1 from storage tank 2 through charging line 3 and valve 4. Ammonia is introduced into this liquid fluorinated product through line 5 and valve 6.

A return line 7 running from still-pot 1 to storage tank 2, and equipped with valve 8, is provided to equalize the pressures in these two vessels. Storage tank 2 is further provided with an inlet pipe 9 controlled by valve 10, and through which the material to be purified may be admitted.

The liquid mixture in still-pot 1 is agitated (agitator not shown) and heated by means of steam coils 11. The vapors pass upward through fractionating column 12 and line 13 and are liquefied in condenser 14. The liquid from condenser 14 passes into line 15. In order to recirculate the liquid valve 16 is open and valve 17 closed, allowing the liquid to flow into line 19 through a trap 20 and thence to column 12. Trap 20 is equipped with a sample line 21 controlled by valve 22. Samples drawn from this line are tested for acidic impurities and ammonia.

If acidic impurities are present, more ammonia is introduced into the cycle. On the other hand, if ammonia is present in excess, additional quantities of the liquid to be purified may be introduced from storage tank 2; or, if desired, the excess ammonia may be neutralized by cautious addition of an acidic substance such as hydrogen chloride. When tests indicate that neither acidic impurities nor ammonia are present in the fluorinated product, the desired fraction or fractions thereof are recovered. This is preferably accomplished by opening valve 18 and partially opening valve 17 so that a part of the condensate from condenser 14 flows through line 15, valve 17 and valve 18 into a receiver 23 provided with cooling coils 24. Another portion of the condensate continues to flow through valve 16, line 19 and trap 20 to column 12 where it serves as a reflux liquid. The purified product collected in receiver 23 may be removed intermittently or continuously as desired through line 27 and valve 28.

Gases formed or present in the system may be removed from receiver 23 through line 25 controlled by valve 26; or, if desired, gases may be removed through a valved vent 35. The residue in still-pot 1 may be removed conveniently through line 29 controlled by valve 30. Lines 15 and 19 are provided with sight-glasses 31 and 32 as an aid in regulating the rate of flow of the liquid from the condenser. Gauges 33 on receiver 23 and 34 on still-pot 1 are provided to indicate the pressure in the system. When it is desired to carry out the distillation under sub-atmospheric pressure, reduction in the pressure may be effected by means of a suitable vacuum pump 38 connected to receiver 23 through line 39 and valve 40.

Considerable variation is permissible in the procedure and the type of apparatus above described. All or a part of the ammonia, instead of being introduced into still-pot 1, may be introduced into storage tank 2 by way of valved inlet 36 or into charging line 3 by way of valved inlet 37. Coils 11 which are normally employed for heating may also function as cooling coils. Sample line 21 may be located at some other convenient point in the cycle. The same is true of vacuum pump 38. Column 12 may be packed or plated or of any other design suitable for distillation. Parts of the apparatus which are maintained at temperatures substantially above or below outside temperatures should be lagged. Obviously, the apparatus is merely conventionally illustrated and may vary widely in details of a character well-known in the industry.

The invention will be further illustrated by the following examples in which the proportions are given in parts by weight:

*Example I*

A liquid mixture containing 700 parts of difluoro-dichloro-methane, 300 parts of fluoro-trichloro-methane, 5 parts of carbon tetrachloride, and 0.1 to 1.0 parts of phosgene and sulfur dioxide is run into a still and distillation started under a pressure of about 65 pounds per square inch (gauge). Under this pressure difluoro-dichloro-methane boils at a temperature of about 18–20° C. and fluoro-trichloro-methane at a higher temperature. About 0.1 part of ammonia gas is added to the still during the early stages of distillation. The distillate is tested for phosgene and sulfur dioxide. If either is present another portion of ammonia gas is added to the still. Tests for phosgene and sulfur dioxide are again made, and if they are present, more ammonia is added and the tests repeated. The cycle of testing and adding ammonia is continued until the distillate is entirely free from phosgene and sulfur dioxide.

Up to this time all of the distillate has been allowed to run back to the still. Now, however, a portion of the distillate is allowed to flow to suitable storage receivers. When substantially all of the difluoro-dichloro-methane has been recovered, the distillation is continued under atmospheric pressure until the fluoro-trichloro-methane and carbon tetrachloride have been recovered. At atmospheric pressure fluoro-trichloro-methane boils at about 23.6° C.

*Example II*

The vapors of 500 parts of crude difluoro-dichloro-methane produced by the reaction of hydrogen fluoride and carbon tetrachloride in the presence of an antimony fluoro-chloride catalyst are passed through a scrubber containing a solution of an alkali metal hydroxide, milk of lime, or the like solution and then through a scrubber containing 95% sulfuric acid. Liquefaction is effected by introducing the resultant gas into a condenser maintained at a temperature of about −50° C. The condensate is collected in a receiver to which has been added about 15 parts of dry soda ash. From this receiver the fluorinated product is run into a still, treated with ammonia, as in Example I, and the difluoro-dichloro-methane recovered by distillation as previously described.

The invention is generally applicable to the purification of compounds containing one or more acyclic carbon atoms having attached thereto one or more fluorine atoms. Included among such compounds are fluorinated products such as are obtained by the fluorination of methylene chloride ($CH_2Cl_2$), fluoro-trichloro-methane ($CFCl_3$), ethyl chloride ($CH_3-CH_2Cl$), isopropyl bromide ($CH_3-CHBr-CH_3$), ethylene dibromide ($CH_2Br-CH_2Br$), tetrachlorethane ($CHCl_2-CCl_2$), trichlorethylene ($CHCl=CCl_2$), chloroform ($CHCl_3$), carbon tetrachloride ($CCl_4$), tri-fluoro-trichloro-ethane ($C_2F_3Cl_3$), dichloro-ethane ($C_2Cl_2H_4$), hexachlorethane ($C_2Cl_6$), tetrachlorethylene ($Cl_2C=CCl_2$), and halogen derivatives of higher members of the aliphatic series. Among the products produced by the fluorination of halogenated hydrocarbons such as tetrachlorethane and trichlorethylene are completely halogenated fluorinated hydrocarbons such as difluoro-tetrachloro-ethane, trifluoro-trichloro-ethane, tetrafluoro-dichloro-ethane and pentafluoro-chloro-ethane. The term halogenated aliphatic hydrocarbon is used in the specification and claims to mean aliphatic hydrocarbons in which one or more or even all of the hydrogen atoms have been substituted or replaced by halogens. It will be understood that the term fluorinated aliphatic hydrocarbon refers to halogenated aliphatic hydrocarbons containing at least one fluorine atom.

The proportions of ammonia employed in accordance with the invention may vary within relatively wide limits depending largely upon the kind and amount of acidic impurities in the compounds treated. Ordinarily, the addition of ammonia is made upon an empirical basis, for instance, as described in the examples. However, if desired, the amount of ammonia to be added may be predetermined by testing the product for phosgene, sulfur dioxide, etc., and calculating the proportions of ammonia chemically equivalent to these acidic impurities. The ammonia should preferably be anhydrous and in gaseous form.

In distilling the desired products from the products formed by the combination of the acidic impurities with ammonia, the method of procedure is susceptible of considerable variation and modification, particularly as regards the pressures and temperatures employed. Generally speaking, the temperature and pressure should be so regulated as to avoid decomposition of the product formed by the combination of the ammonia and certain of the acidic impurities. At atmospheric pressure, temperatures below about 60–70° C. are preferably employed. For the recovery of liquids which are gases at ordinary temperatures such as, for example, difluoro-dichloro-methane, the distillation is preferably made under superatmospheric pressure. On the other hand, relatively high boiling liquids such as, for example, difluoro-tetrachloro-ethane (B. P. 93° C.) are preferably distilled under sub-atmospheric pressure.

The advantages of this invention in its application to the purification of fluorinated organic compounds will be apparent. It enables the removal of certain undesirable and obnoxious impurities from these products which if allowed to remain therein would render them not only disagreeable to handle but unsatisfactory for the large commercial uses to which they are applied. Pure difluoro-dichloro-methane, for example, is an excellent refrigerant not only because of its thermal properties but also because it possesses other desirable qualities of high commercial utility in being stable and non-toxic. On the other hand, difluoro-dichloro-methane containing even relatively small amounts of sulfur dioxide and phosgene is an almost unusable product. The invention is further of value because it enables the removal of acidic impurities from organic fluorine compounds without contaminating the product with water. It will be recognized that this is particularly advantageous in the production of products which are to be used as refrigerants.

As many apparent and widely different embodiments of this invention may be made without departing from the spirit thereof, it is to be understood that I do not limit myself to the foregoing examples or description except as indicated in the following claims.

I claim:

1. The process of purifying fluorinated aliphatic hydrocarbons containing acidic impurities which includes contacting ammonia therewith, and separating the fluorinated aliphatic hydrocarbons from the resultant product.

2. The process of purifying a product containing fluorinated aliphatic hydrocarbons and acidic impurities which includes contacting said product in liquid phase with substantially dry ammonia, and separating the fluorinated aliphatic hydrocarbons from the resultant product.

3. The process of purifying difluoro-dichloro-methane containing small amounts of acidic impurities which includes contacting ammonia therewith, and separating the difluoro-dichloro-methane from the resultant product.

4. The process of purifying difluoro-dichloro-methane containing small amounts of acidic impurities which includes contacting substantially dry ammonia therewith, and separating the difluoro-dichloro-methane from the resultant product.

5. The process of purifying difluoro-dichloro-methane containing phosgene which includes contacting ammonia therewith, and separating the difluoro-dichloro-methane from the resultant product.

6. The process of purifying fluorinated aliphatic hydrocarbons or mixtures thereof, containing an acidic impurity which includes contacting said compounds in liquid form with ammonia, and subjecting the resultant product to fractional distillation under conditions of temperature and pressure causing substantially no decomposition of the product formed by the chemical combination of ammonia and the acidic impurity.

7. In the manufacture of fluorinated aliphatic hydrocarbons by reaction of a fluorinating agent with a compound containing an acyclic carbon atom having attached thereto a halogen other than fluorine, after treating the reaction product to remove hydrogen halides and thereafter subjecting the product obtained to treatment with sulfuric acid to effect drying thereof, the step which comprises contacting the resultant product with ammonia.

8. In the manufacture of fluorinated aliphatic hydrocarbons by reaction of a fluorinating agent with a compound containing an acyclic carbon atom having attached thereto a halogen other than fluorine, after scrubbing the reaction product with an alkaline solution to remove hydrogen halides and thereafter subjecting the product obtained to treatment with sulfuric acid to effect drying thereof, the step which comprises introducing into the product in liquid phase at a relatively low temperature sufficient substantially dry ammonia to react with substantially all of the acidic impurities which are present and separating the fluorinated aliphatic hydrocarbons from the resultant product by distillation.

9. In the manufacture of difluoro-dichloro-methane by reaction of a fluorinating agent with a substituted methane having at least one atom of a halogen other than fluorine, after treating the reaction product to remove hydrogen halides therefrom and drying said product, the step which comprises contacting the product obtained with ammonia, and separating the difluoro-dichloro-methane.

10. In the manufacture of a difluoro-dichloro-methane by the reaction of hydrogen fluoride, an antimony fluoro-chloride and carbon tetrachloride, after scrubbing the reaction product with an alkaline solution to remove hydrogen halides and thereafter subjecting the product obtained to treatment with sulfuric acid to effect drying thereof, the step which comprises introducing into the product in liquid phase sufficient ammonia to react with substantially all of the acidic impurities which are present, and separating the difluoro-dichloro-methane from the resultant product by distillation under conditions of temperature and pressure preventing decomposition of the products formed by the chemical combination of ammonia and the acidic impurities.

11. The process of purifying a product containing completely halogenated, fluorinated aliphatic hydrocarbons and acidic impurities which includes contacting such product in liquid phase with ammonia, and separating the completely halogenated, fluorinated aliphatic hydrocarbons from the resultant product.

12. The process of purifying a product containing fluoro-chloro aliphatic hydrocarbons and acidic impurities which includes contacting said product in liquid phase with ammonia, and separating the fluoro-chloro aliphatic hydrocarbons from the resultant product.

13. The process of purifying a product containing fluoro-chloro aliphatic hydrocarbons having less than three carbon atoms, and acidic impurities which includes contacting said products in liquid phase with ammonia, and separating the fluoro-chloro aliphatic hydrocarbons from the resultant product.

14. The process of purifying a product containing halogen-saturated fluoro-chloro aliphatic hydrocarbons having less than three carbon atoms, and acidic impurities which includes contacting said product in liquid phase with ammonia, and separating the fluorinated aliphatic hydrocarbons from the resultant product.

15. In the manufacture of fluoro-chloro aliphatic hydrocarbons having less than three carbon atoms by reaction of a fluorinating agent with a chloro aliphatic hydrocarbon having less than three carbon atoms, after treating the reaction product to remove hydrogen halides therefrom and drying said product, the step which comprises contacting the product obtained with substantially dry ammonia, and separating the fluoro-chloro aliphatic hydrocarbon.

16. In the manufacture of completely halogenated fluorinated aliphatic hydrocarbons containing less than three carbon atoms by reaction of a fluorinating agent with a halogen-substituted aliphatic hydrocarbon having less than three carbon atoms and at least one atom of halogen other than fluorine, after treating the reaction product to remove hydrogen halides therefrom and drying said product, the step which comprises contacting the product obtained with substantially dry ammonia, and separating the completely halogenated fluorinated aliphatic hydrocarbon.

17. In the manufacture of fluoro-trichloro-methane by reaction of a fluorinating agent with a halogen-substituted methane not containing fluorine, after treating the reaction product to remove hydrogen halides therefrom and drying said product, the step which comprises contacting the product obtained with ammonia, and separating the fluoro-trichloro-methane.

18. In the manufacture of tetrafluoro-dichloro-ethane by reaction of a fluorinating agent with a halogen-substituted ethane having at least one atom of a halogen other than a fluorine, after treating the reaction product to remove hydrogen halides therefrom and drying said product, the step which comprises contacting the product obtained with ammonia, and separating the tetrafluoro-dichloro-ethane.

19. The process of purifying fluorinated aliphatic hydrocarbons containing phosgene which includes contacting ammonia therewith, and separating the fluorinated aliphatic hydrocarbons from the resultant product.

20. The process of purifying completely halogenated fluorinated aliphatic hydrocarbons having less than three carbon atoms and containing phosgene, which includes contacting ammonia therewith, and separating the completely halogenated fluorinated aliphatic hydrocarbons from the resultant product.

21. The process of purifying a completely halogenated fluorinated aliphatic hydrocarbon having less than three carbon atoms and containing sulfur dioxide which includes contacting ammonia therewith, and separating the completely halogenated fluorinated aliphatic hydrocarbon.

RAYMOND A. DUNPHY.